to novel compositions of matter and to means of producing the same. More particularly, the invention relates to 3-phenyl-2,4-pyrrolidinedione compounds having the formula,

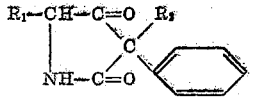

in which formula $R_1$ represents hydrogen or a methyl group and $R_2$ represents a lower alkyl group, especially an alkyl group containing from one to four carbon atoms.

Prior to the present invention, various alkyl substituted pyrrolidinedione compounds were known and it was further known that certain of these compounds possess the ability to produce sleep and in some cases to protect against epileptic convulsion. The compound 3-ethyl-3-propyl-2,4-pyrrolidinedione, for example, possesses anticonvulsant properties but causes profound hypnosis when administered at a dosage of 250 mg./kg. and hence is of no practical value as an anticonvulsant agent. Because of this unfavorable characteristic, the known alkyl substituted pyrrolidinediones in general are wholly unsuited as agents for the treatment of epilepsy.

According to the present invention there are provided novel phenyl substituted pyrrolidinedione compounds which while posessing significant anticonvulsant properties, are surprisingly free of toxic side-effects and hence are applicable for the treatment of petit mal epilepsy.

In accordance with the invention, the instant pyrrolidinedione compounds are produced by reacting an N-phenyl-acetyl-2-aminoacid ester having the formula,

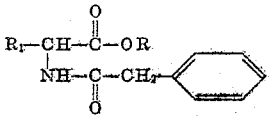

in the presence of an inert organic solvent with substantially one equvalent of an alkali metal lower alkoxide, amide or hydride thereby closing the pyrrolidine ring, and reacting the resulting 3-phenyl-2,4-pyrrolidinedione with substantially one equivalent of an alkylating agent; in which formula R represents a methyl or ethyl group and $R_1$ has the afore-mentioned significance. The reaction involving closure of the ring can be carried out over a wide range of temperature. Preferably, so as to minimize the reaction time, the reaction is carried out in the range from about 60 to 100° C. The preferred alkoxides, amides and hydrides for the reaction are sodium methoxide, sodium ethoxide, sodamide, sodium hydride and the like. As solvents for the reaction, benzene, xylene, toluene, dioxane and the like may be mentioned as preferred examples.

The alkylation reaction can be carried out with a variety of alkylating agents over a wide range of temperature, preferably in the presence of an inert organic solvent such as dimethylformamide and the like. As alkylating agents one may use alkyl halides, dialkyl sulfates, monoalkyl and dialkyl sulfonates and the like, in substantially equivalent proportion for the alkylation of the 3-position and for the alkylation of both the 3- and the 5-positions at least two equivalents. The alkylation may be carried out over a wide range of temperature. The preferred temperature range is about 50 to 100° C.

The process of the invention can also be carried out by reacting a 4-phthalimidoacetoacetic acid ester having the formula,

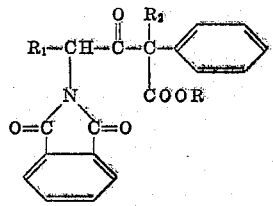

with substantially one equivalent of hydrazine in the presence of an inert organic solvent, where R, $R_1$ and $R_2$ have the aforementioned significance. The temperature of the reaction is not critical and can be varied widely. The preferred range of temperature is about 40 to 100° C. The hydrazine can be supplied in any convenient form such as hydrazine hydrate and the like. Various inert solvents for the reaction are satisfactory such as methanol, ethanol, dimethyl formamide, etc.

The invention is illustrated by the following examples.

*Example 1*

17 g. of bromine is added dropwise to a cold solution of 22 g. of ethyl 2-methyl-2-phenylacetoacetate in 250 ml. of ether. After complete addition the pale yellow solution is stirred for one hour at ice bath temperatures. Then the solution is added with shaking to an equal quantity of ice and water. The ether layer is separated and washed with 5% solution of sodium bicarbonate. The ethereal solution is dried and evaporated. The residual oil is crude ethyl 4-bromo-2-methyl-2-phenylacetoacetate. This oil is added to 130 ml. of dimethylformamide and treated with 18.5 g. of potassium phthalimide. The reaction mixture is heated to 75° for one hour, filtered and the filtrate diluted with an equal volume of cold water. The precipitate is removed by filtration and recrystallized from ethanol to give ethyl 2-methyl-2-phenyl-4-phthalimidoacetoacetate; M.P. 122–123° C.

20 g. of ethyl 2-methyl-2-phenyl-4-phthalimidoacetoacetate and 3.3 g. of hydrazine hydrate in 100 ml. of methanol are heated at reflux temperature for one hour. The reaction mixture is cooled and filtered. The filtrate is evaporated to dryness and the residual product, 3-methyl-3-phenyl-2,4-pyrrolidinedione, recrystallized from methanol; M.P. 128–130° C.

*Example 2*

To 30 g. of ethyl 2-ethyl-2-phenylacetoacetate in 100 ml. of ether is added 21.5 g. of bromine dropwise with cooling. After complete addition and decolorization, the pale yellow solution is stirred at 0 to 5° C. for one hour. The solution is added with shaking to an equal quantity of ice water, the ether layer is decanted and washed with 5% solution of sodium bicarbonate. The ethereal solution is dried over anhydrous magnesium sulfate and evaporated. The residual oil which is ethyl 4-bromo-2-ethyl-2-phenylacetoacetate is dissolved in 130 ml. of dimethylformamide and treated with 23.7 g. of potassium phthalimide. The reaction mixture is heated to 75° C. for one hour, filtered and the filtrate diluted with an equal volume of cold water. The precipitate is removed and recrystallized from ethanol to give ethyl 4-phthalimido-2-ethyl-2-phenylacetoacetate; M.P. 100–101° C.

11 g. of ethyl 4-phthalimido-2-ethyl-2-phenylacetoacetate, 1.5 g. of hydrazine hydrate and 60 ml. of methanol are refluxed for 2 hours. The reaction mixture is cooled to 30° and filtered. The filtrate is evaporated on a steam bath and the residue treated with 300 ml. of anhydrous ether and filtered. The ethereal solution on evaporation and cooling yields 3-ethyl-3-phenyl-2,4-pyrrolidinedione; M.P. 166–167° C.

*Example 3*

40 g. of ethyl 2-phenylacetoacetate is added dropwise to a mixture of 5 g. of sodium hydride in 500 ml. of dimethylformamide. After fifteen minutes, 30 g. of n-propyl bromide is added in portions and the reaction mixture is then heated for one hour on the steam bath, cooled and filtered. The filtrate is diluted with water and then extracted with ether. The ethereal extracts are washed, dried and evaporated. The residue is distilled in vacuo to give ethyl 2-phenyl-2-propylacetoacetate; B.P. 157–163° C. at 11.5 mm.

13.6 g. of bromine is added dropwise with cooling to 20 g. of ethyl 2-phenyl-2-n-propylacetoacetate in 60 ml. of ether. After complete addition, cooling is discontinued and the reaction mixture allowed to cool to room temperature. The mixture is poured into 100 ml. of ice and water and the ether solution washed well with water and dried. The ether is removed by evaporation and the residue which is crude ethyl 4-bromo-2-phenyl-2-n-propylacetoacetate is added to a solution consisting of 15 g. of potassium phthalimide in 90 ml. of dimethylformamide. The reaction mixture is heated at 75° C. for 1½ hours, filtered and the filtrate diluted with equal volumes of water. The precipitate is removed by filtration and recrystallized from a mixture of ether and petroleum ether to give ethyl 2-phenyl-2-n-propyl-4-phthalimidoacetoacetate; M.P. 110–111° C.

11 g. of ethyl 2-phenyl-2-n-propyl-4-phthalimidoacetoacetate and 1.7 g. of hydrazine hydrate in 50 ml. of methanol is heated at reflux temperatures for one hour. The warm solution is filtered and the filtrate is evaporated. The residual product, 3-phenyl-3-n-propyl-2,4-pyrrolidinedione, is taken up in hot ether and collected as the crystalline precipitate which separates on cooling; M.P. 165–167° C.

*Example 4*

(a) 178 g. of dl-alanine is dissolved in one liter of water containing 80 g. of sodium hydroxide. The solution is cooled to 0–5° C. and 309 g. of phenylacetyl chloride is added dropwise with the concurrent addition of 80 g. of sodium hydroxide in one liter of water. The reaction mixture is well-stirred and the solution is stirred for one hour after the complete addition. The reaction mixture acidified to Congo red and filtered. The filter cake is recrystallized from 50% ethanol to give N-phenylacetyl-alanine; M.P. 153–155° C.

145 g. of N-phenylacetylalanine is dissolved in 1.5 liters of absolute methanol and one ml. of concentrated hydrochloric acid is added. After standing for 72 hours at room temperature, the hydrochloric acid is neutralized with sodium bicarbonate and the solution evaporated to about 800 ml. On addition of 700 ml. of water and cooling a product crystallizes. This product is removed by filtration and is N-phenylacetylalanine methyl ester; M.P. 69–71° C.

178 g. of the methyl ester of N-phenylacetylalanine, 600 ml. of dry toluene and 45 g. of sodium methoxide are stirred and heated together until the temperature of the distillate has increased to 75° C. The reaction mixture is cooled and the solidified oil crushed and filtered. The filter cake is dissolved in water and precipitated by the addition of 6-normal hydrochloric acid. The precipitate is removed by filtration and recrystallized from dilute methanol to yield 5-methyl-3-phenyl-2,4-pyrrolidinedione; M.P. 196–198° C.

A suspension of 50 g. of 5-methyl-3-phenyl-2,4-pyrrolidinedione in 50 ml. of dimethylformamide is introduced slowly into a flask containing a stirred suspension of 6.4 g. of sodium hydride in 150 ml. of dimethylformamide. After complete addition the reaction mixture is stirred for one hour. To this reaction mixture is added portion-wise 45 g. of methyl iodide. This mixture is then heated at 80° C. for 2 hours. The contents of the flask are filtered, cooled and diluted with an equal volume of water. The white precipitate, 3,5-dimethyl-3-phenyl-2,4-pyrrolidinedione, is removed by filtration and recrystallized from dilute methanol; M.P. 147–149° C.

(b) 21 grams of ethyl 4-methyl-2-phenylacetoacetate in 200 ml. of dimethylformamide is treated with 0.25 g. of sodium hydride for one-quarter hour, 15 g. of methyl iodide is added, and after stirring for one-half hour the reaction mixture is filtered. The filtrate is diluted with water and the resulting product which separates, ethyl 2,4-dimethyl-2-phenyl-acetoacetate, is recovered and purified by recrystallization from ether-alcohol mixture. Bromine (16 g.) is added dropwise to a cold solution of 22.5 g. of ethyl 2-methyl-2-phenylpropionoacetate in 250 ml. of ether. The resulting mixture is stirred for one hour in the cold and then added to an equal quantity of ice and water. The ether layer is separated, washed with 5% aqueous sodium bicarbonate solution, dried and the ether removed by evaporation. The residual product, ethyl 4-bromo-2,4-dimethyl-2-phenylacetoacetate, is taken up in 130 ml. of dimethylformamide, 18.5 g. of potassium phthalimide is added and the mixture is heated at 75° C. for three to four hours. The mixture is filtered and the filtrate diluted with an equal volume of cold water. The resulting ethyl 2,4-dimethyl-2-phenyl-4-phthalimidoacetoacetate which separates is collected, recrystallized from ethanol and heated together with an equivalent quantity of hydrazine hydrate in 100 ml. of methanol at reflux temperature. After one hour the mixture is cooled and filtered, and the filtrate is concentrated by removal of the methanol in vacuo. The residual product, 3,5-dimethyl-3-phenyl-2,4-pyrrolidinedione is purified by recrystallization from dilute aqueous methanol; M.P. 147–149° C.

I claim:

1. Process of producing alkylated 3-phenyl-2,4-pyrrolidinedione compounds which comprises reacting an N-phenylacetyl-2-aminoacid ester having the formula

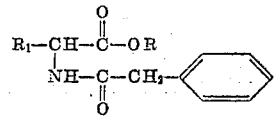

with substantially one equivalent of a member of the group consisting of alkali metal alkoxides, amides and hydrides, in the presence of an inert organic solvent, and reacting the resulting 3-phenyl-2,4-pyrrolidinedione with substantially one equivalent of an alkylating agent of the class consisting of lower alkyl halides, lower dialkyl sulfates, lower dialkyl sulfonates and lower monoalkyl sulfonates, where R represents an alkyl group containing from one to two carbon atoms and $R_1$ is selected from the group consisting of hydrogen and methyl.

2. Process according to claim 1 wherein the aminoacid ester is N-phenylacetylalanine methyl ester and the alkylating agent is methyl iodide.

References Cited in the file of this patent

UNITED STATES PATENTS 2,328,232    Schnider _____ Aug. 31, 1943

FOREIGN PATENTS 726,069    Great Britain _____ Mar. 16, 1955
1,013,654    Germany _____ Aug. 14, 1957

OTHER REFERENCES

Miller et al.: J. Amer. Chem. Soc., vol. 73, p. 4896 (1951).

Petersen et al.: Chemical Abstracts, vol. 50, page 481a, (1956).

Murakoshi: "J. Pharm. Soc. Japan," vol. 76, pp. 1139–1142 (1956).